US005299927A

United States Patent [19]

Steffens et al.

[11] Patent Number: 5,299,927

[45] Date of Patent: Apr. 5, 1994

[54] VACUUM PRESS FOR CONTINUOUS PRODUCTION OF PLASTIC EXTRUDED MASSES

[75] Inventors: Eberhard Steffens; Wolfram Kunze, both of Görlitz; Klaus Lorenz, Markersdorf; Holger Kießling, Görlitz, all of Fed. Rep. of Germany

[73] Assignee: Kema-Keramikmaschinenbau GmbH Gorlitz, Gorlitz, Fed. Rep. of Germany

[21] Appl. No.: 851,483

[22] Filed: Mar. 13, 1992

[30] Foreign Application Priority Data

Mar. 14, 1991 [DE] Fed. Rep. of Germany ....... 4108342

[51] Int. Cl.[5] .............................................. B29C 47/08

[52] U.S. Cl. ................................ 425/188; 425/192 R; 425/197; 425/203; 425/204

[58] Field of Search .................. 366/83; 425/182, 188, 425/192 R, 197, 198, 203, 204, 205, 225, 382.3, 382.4, 405.1

[56] References Cited

U.S. PATENT DOCUMENTS

| | | | |
|---|---|---|---|
| 1,356,691 | 10/1920 | Bowen et al. | 366/83 |
| 2,257,695 | 9/1941 | Lihotzky | 425/188 |
| 2,918,714 | 12/1959 | Garvey | 425/188 |
| 3,304,579 | 2/1967 | Ashworth, Jr. | 425/192 |
| 3,561,371 | 2/1971 | Kummer | 425/188 |
| 3,574,891 | 4/1971 | Bredeson et al. | 425/188 |
| 4,028,027 | 6/1977 | Worz | 425/204 |
| 4,089,510 | 5/1978 | Picard et al. | 366/83 |
| 4,234,298 | 11/1980 | Spielhoff | 425/192 R |
| 4,385,876 | 5/1983 | Scherping et al. | 425/204 |
| 4,986,745 | 1/1991 | Hagiwara | 425/192 R |

FOREIGN PATENT DOCUMENTS

| | | | |
|---|---|---|---|
| 56-113 | 1/1981 | Japan | 425/188 |
| 514708 | 6/1976 | U.S.S.R. | 425/188 |
| 765383 | 1/1957 | United Kingdom | 425/188 |

*Primary Examiner*—Charles S. Bushey
*Attorney, Agent, or Firm*—Michael L. Dunn

[57] ABSTRACT

Cleaning of vacuum presses is facilitated by providing a vacuum press housing that is composed of pivotable housing elements which are in turn pivotally attached to the press frame. The horizontally hinged cylinder halves that serve as housing elements of the preliminary press are connected by way of a flange connection to a sieve plate holder which is likewise arranged on a U-shaped support of the press frame so that it is pivotally movable horizontally. Arranged displaceably at the other end of the press is a joint washer with radial and lateral sealing means. The vacuum chamber which can be raised and lowered vertically and which can be pivoted horizontally is releasably connected to the joint washer by snap closure means. Pivotal movement of the vacuum chamber is ensured by a hinge connection to the U-shaped support. The vacuum chamber is placed upon the filler opening of the lower press, and is secured by means of snap closure means. Mixing troughs of the lower and preliminary presses are each formed by two housing elements, the inner wall of which elements are adapted to suit or fit the contour of the receiving spaces and of the screw presses. The housing elements are radially pivotally connected to the press frame by way of vertically displaceable supports.

10 Claims, 3 Drawing Sheets

(A-A)

VACUUM PRESS FOR CONTINUOUS PRODUCTION OF PLASTIC EXTRUDED MASSES

BACKGROUND OF THE INVENTION

The invention relates to an improved vacuum press for continuous production of plastic extruded masses. The area of application of the invention is, in particular, the ceramics industry.

Known vacuum presses generally consist of a preliminary press or an upper press or mixer and a lower press, and a vacuum chamber which is interposed for the purpose of vacuuming the plastic mass being processed.

In order to obtain an extruded mass of high quality, it is necessary to clean the vacuum press at relatively frequent intervals to remove solidified mass inclusions, for example, from the extruded mass.

Unfortunately, it is often time-consuming to clean a vacuum press because the parts of the machine which come into contact with the mass are only accessible with difficulty or are only accessible after parts of the vacuum press have been dismantled. With a known vacuum press, the vacuum chamber is divided diagonally for cleaning purposes, and the press cylinder of the lower press is designed so that it is hinged. However, it is almost impossible to clean the upper press.

With another known vacuum press, lateral lids are provided on a level with the receiving rollers which assist in introducing the mass into the screw press. However, this solution brings no fundamental improvement with regard to cleaning the vacuum press.

A vacuum press is also known, wherein the screw presses can be removed from the press cylinders. This procedure admittedly provides good access to the parts which are in contact with the mass, but quite a high degree of structural and manufacturing expertise is required.

A purpose of the invention is to provide means for fast, extensive cleaning of vacuum presses.

Another purpose of the invention is to permit effective cleaning of the parts of the press which come into contact with the mass, by permitting optimum accessibility to those parts.

SUMMARY OF THE INVENTION

In accordance with the invention, there is provided a vacuum press having housing elements that are detachable from the press to facilitate cleaning of the press.

A vacuum press of the invention comprising a preliminary press, a vacuum chamber, and a lower press has the following features and combinations thereof:

a preliminary press housing; a lower press housing; detachable housing elements forming a part of said preliminary press housing and said lower press housing;

a sieve plate holder connected to said detachable housing elements; said sieve plate holder being arranged to be pivotally movable with respect to said press housing;

a vacuum chamber; said vacuum chamber arranged so that it can be raised and lowered vertically and also moved horizontally; said vacuum chamber capable of being secured when situated on a filler opening of said lower press;

mixing troughs of said preliminary press and said lower press composed of second housing elements; said second housing elements being adapted to fit the contour of receiving spaces of said preliminary press and said lower press and to fit the screw presses of said preliminary press or said lower press; and said second housing elements being pivotally attached to the press frame.

BRIEF DESCRIPTION OF THE DRAWING

The vacuum press according to the invention will be illustrated in the drawings, wherein.

DETAILED DESCRIPTION OF THE INVENTION

Figure 2:
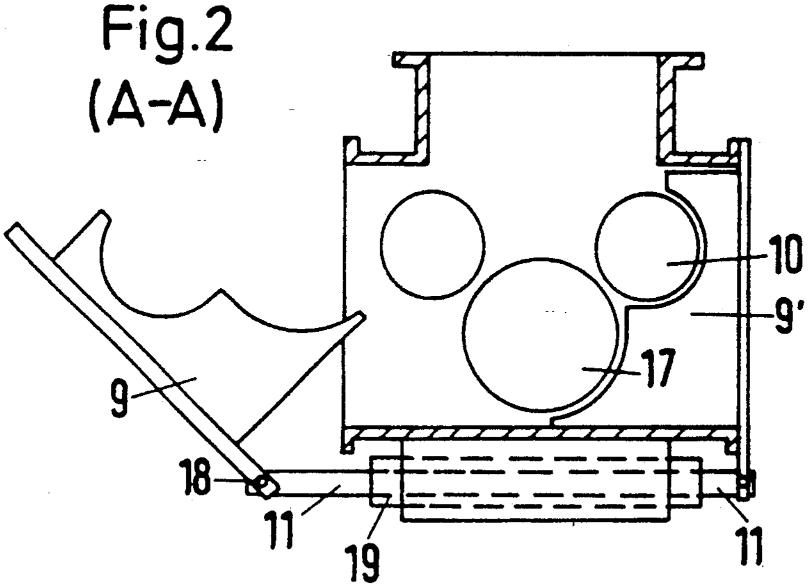
FIG. 2 shows section A—A of FIG. 1.

The vacuum press of the invention is comprised of a preliminary press or upper press or mixer, a lower press and a vacuum chamber. In accordance with the invention, the vacuum press has pivot housing elements which are in turn pivotally attached to the press frame. The horizontally hinged housing elements, such as cylinder halves, of the preliminary press are preferably connected by way of a flange connection to a sieve plate holder which is likewise arranged on a U-shaped support of the press frame so that it is pivotally movable horizontally. Other means of attachment are possible. Arranged displaceably at the other end of the vacuum press is a joint washer with radial and lateral sealing means. The vacuum chamber which can be raised and lowered vertically, and which can be pivoted horizontally, is releasably connected to the joint washer preferably by snap closure means. Pivotal movement of the vacuum chamber is ensured by a hinge connection to the U-shaped support. Other means for attachment can be used.

The vacuum chamber is placed upon the filler opening of the lower press, and is secured preferably by means of snap closure means. Mixing troughs of the preliminary press and the lower press, are each formed by housing elements, preferably, two in number. The inner wall of the housing elements are adapted to suit or fit the contour of the receiving spaces and of the screw presses. The housing elements are radially pivotally connected to the press frame preferably by way of vertically displaceable supports.

DETAILED DESCRIPTION OF THE DRAWING

Figure 1:
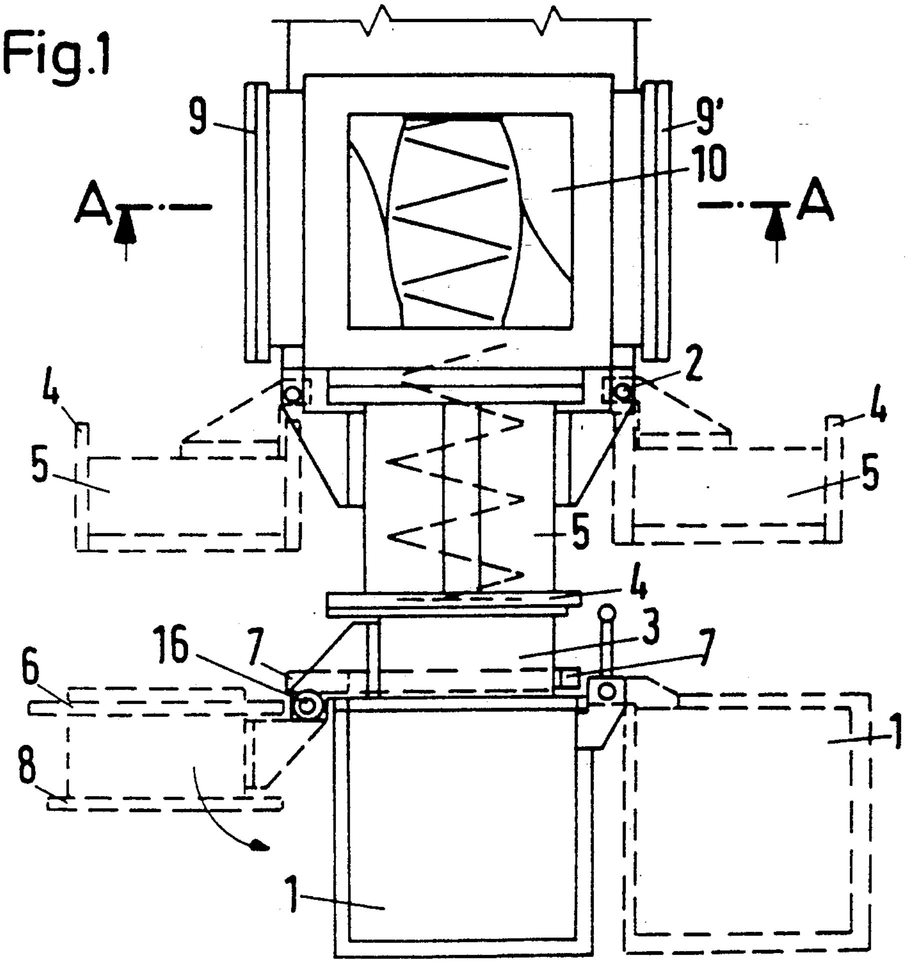
FIG. 1 shows a partial top plan view of the vacuum press.

FIG. 1 illustrates the vacuum press according to the invention, wherein for the sake of simplicity, the lower press has not been shown.

As can be seen in FIG. 1, the cylinder of the upper press 20 is divided vertically into two cylinder halves 5. A hinge 2 which forms the connection between the cylinder halves 5 and the press frame makes it possible for the cylinder halves 5 to pivot horizontally. Broken lines are used to illustrate the cleaning position of the cylinder halves 5.

At the ends of the cylinder halves 5 there are flange parts 4 which are connected to the flange ring 8 of the sieve plate holder 3 by way of known snap closure means. The sieve plate holder 3 is, in turn, also pivotable horizontally, and it is connected to a U-shaped support 7 of the press frame by a hinge 16. An appropriate arrow is used to show the direction of pivotal movement. The sieve plate holder 3 which is shown by broken lines is in the cleaning position. A joint washer 6 is pushed onto the side of the sieve plate holder 3 which is remote from the flange ring 8.

FIG. 2 shows the design of the housing elements 9 and 9' in the region of the receiving spaces 10 which assist in feeding the mass into the screw 17 of the preliminary press. The housing elements 9, 9' enclose the contour of the receiving spaces 10 and screw 17 and they form the mixing trough. Beneath their longitudinal side, the housing elements 9 are joined at a hinge connection 18 to a horizontally displaceable holder 11, which, in turn, is mounted in a guide tube 19 which is fixed to the press frame. The housing element 9 is shown in the cleaning position in FIG. 2. Like the preliminary press, the lower press is also provided with appropriate housing elements 9 and 9'. All the pivotally movable press parts can be secured in their operative positions by known snap closure means.

Figure 3:
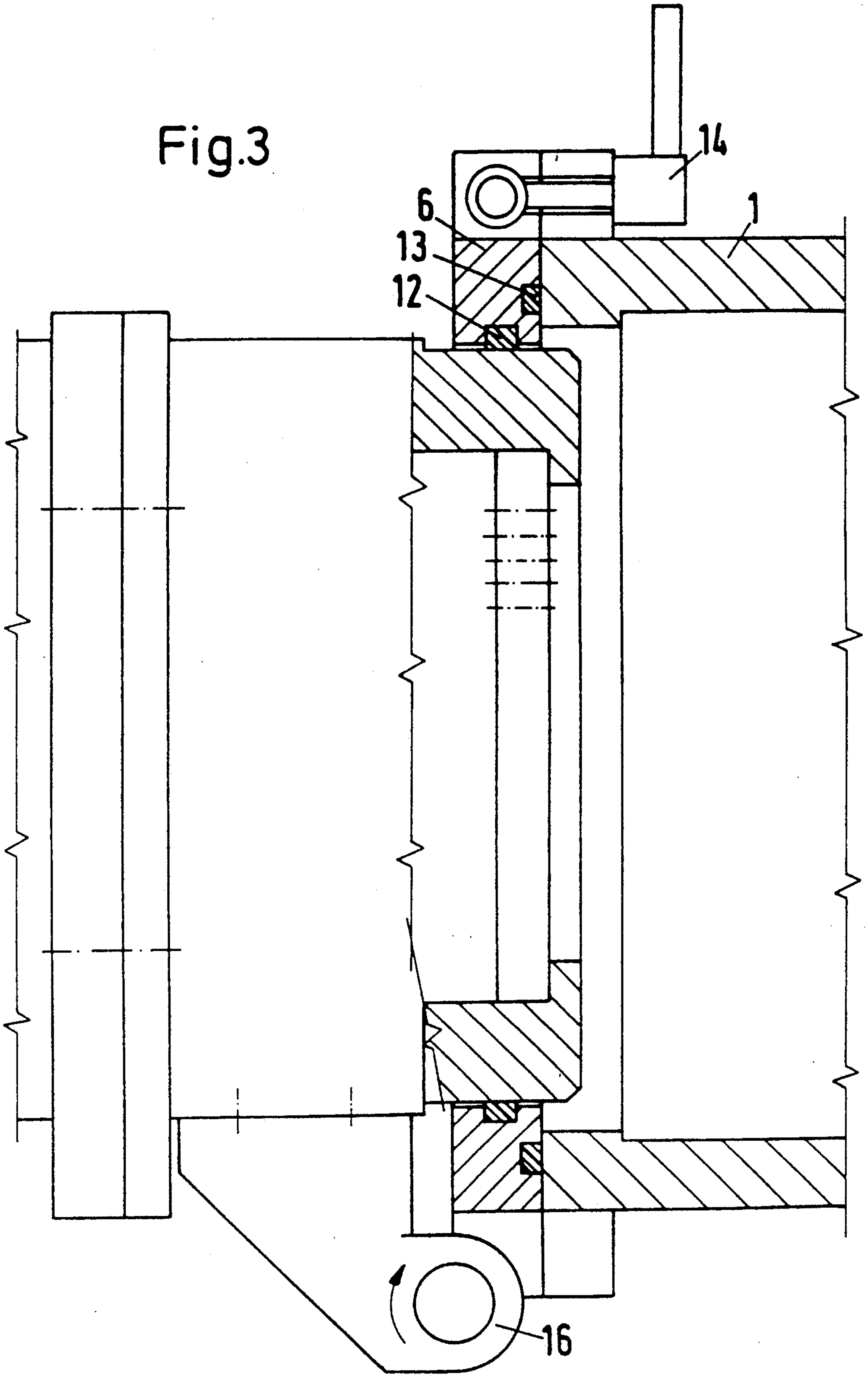
FIG. 3 shows a partial sectional view through the sieve plate holder looking upward.

As shown in FIG. 3, the joint washer 6 has a radial sealing element 12, and a second sealing element 13 on the end of the joint washer 6 ensures that the vacuum chamber 1 is sealed at the end. The vacuum chamber can be connected to the joint washer 6 by means of a snap closure means 14. The vacuum chamber 1 is, in turn, designed so that it can be raised and lowered vertically, and an eccentric, not shown, is provided for that purpose. The capacity of the vacuum chamber 1 to move vertically makes it possible to prevent damage to the seal arranged on the lower side of the vacuum chamber 1 when the vacuum chamber 1 is being placed on or removed from the feed opening of the lower press (not shown). The vacuum chamber 1 has hinges 16 for horizontal pivotal movement, these hinges likewise being connected to the U-shaped support 7.

Figure 4:
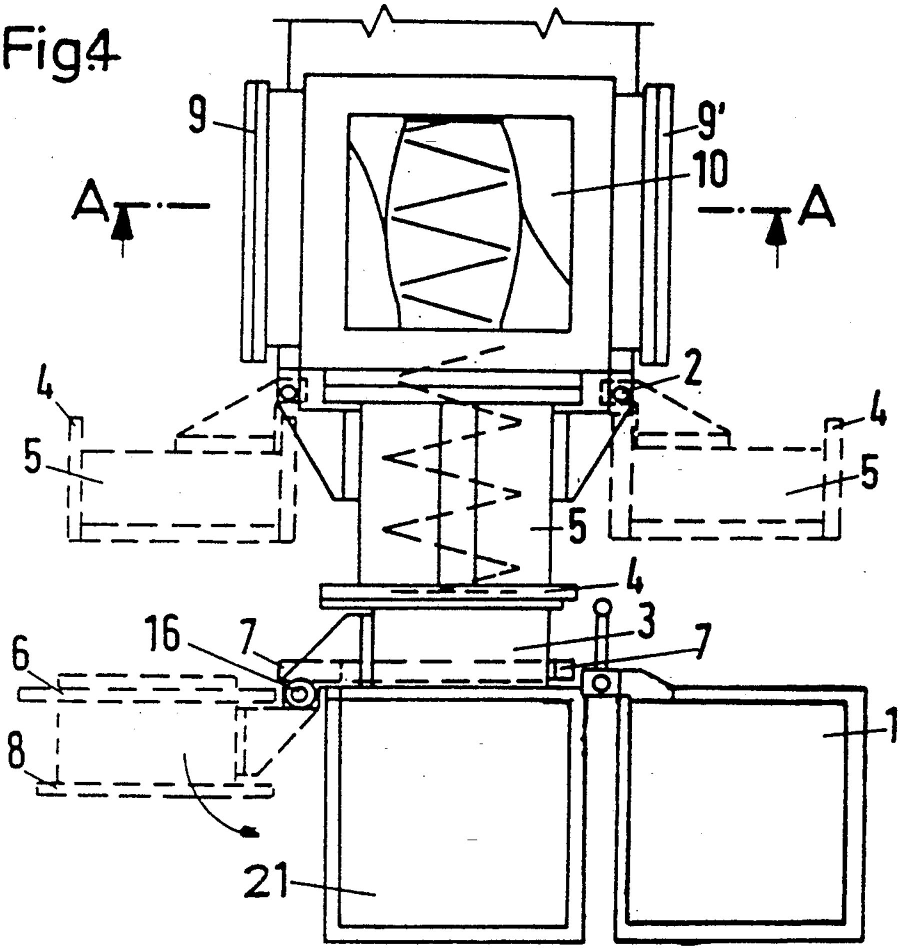
FIG. 4 shows the vacuum chamber moved to its cleaning position, thereby revealing the feed opening to the lower press.

As shown in FIG. 4, the vacuum chamber 1 is now in its cleaning position, after having first been raised by the eccentric (now shown) and horizontally pivotally moved via hinges 16. The vacuum chamber is raised from the feed opening of the lower press 21, thereby preventing damage to the seal as the vacuum chamber is moved to its cleaning position.

Following is a description of the way in which the vacuum press according to the invention is opened for cleaning.

The snap closure means 14 is released in order to completely disconnect the vacuum chamber 1 from the joint washer 6. The connection between the vacuum chamber 1 and the filler opening of the lower press also has to be released. By actuating the eccentric (not shown), it is then possible to lift off the vacuum chamber 1 and to pivot it out of its operative position. The snap closure means of the flange ring 8 of the sieve plate holder 3 and the flange parts 4 of the cylinder halves 5 are then disengaged, and the sieve plate holder 3 can be pivoted out. After the connecting screws of the cylinder halves 5 have been loosened, the cylinder halves can be opened into the position for cleaning.

The snap closure means and the housing elements 9 and 9' forming the mixing trough also have to be released, and then they have to be removed horizontally by means of the holder 11, and pivoted out radially by means of the hinge connection 18. Similarly, the housing elements of the lower press have to be brought into the cleaning position.

All parts of the press which come into contact with the mass are now freely accessible for cleaning.

The housing parts, sieve plate holder and vacuum chamber are brought into the operative position and secured there in a similar way, but by proceeding in reverse order.

What is claimed is:

1. A vacuum press comprising:

an upper press;

an upper press housing;

a lower press;

a lower press housing;

detachable housing elements forming a part of said upper press housing and said lower press housing;

a sieve plate holder connected to said detachable housing elements;

said sieve plate holder arranged to be pivotally movable with respect to a press frame;

a vacuum chamber interposed between said upper press and said lower press;

said vacuum chamber being arranged so that it is movable horizontally via hinge means;

said vacuum chamber being secured to a feed opening of said lower press;

second housing elements comprising mixing troughs of the upper press and the lower press;

said second housing elements conforming to the contour of receiving spaces of said upper and said lower press and also to screw presses of said upper press and said lower press; and said second housing elements being pivotally attached to the press frame.

2. A vacuum press comprising:

an upper press;

an upper press housing;

a lower press;

a lower press housing;

detachable housing elements forming a part of said upper press housing and said lower press housing, said housing elements comprising cylinder halves;

a sieve plate holder connected by means of a flange connection to said cylinder halves;

said sieve plate holder being arranged to be pivotally movable on a U-shaped support which is attached to a press frame above a vacuum chamber;

a vacuum chamber interposed between the upper press and the lower press;

a joint washer which is detachably connectable to said vacuum chamber;

said vacuum chamber being arranged on a support so that it is movable horizontally via hinge means;

said vacuum chamber being secured by snap closure means to a feed opening of said lower press;

second housing elements comprising mixing troughs of the upper press and the lower press;

said second housing elements conforming to the contour of receiving spaces of said upper press and said lower press and also to screw presses of said upper press and said lower press; and said second housing elements being radially pivotally attached to the press frame by vertically displaceable holders.

3. A vacuum press comprising a press housing composed of detachable housing elements; horizontally hinged cylinder halves of an upper press which are connected by way of a flange connection to a sieve plate holder which is likewise arranged so that it is pivotally movable horizontally on a U-shaped support which is attached to a press frame above a vacuum chamber; a joint washer pushed onto the other end of the sieve plate holder, which is in turn detachably connectable to the vacuum chamber; the vacuum chamber being arranged on a support so that it is pivotally movable horizontally via hinge means; the vacuum chamber being placed on a feed opening of a lower press and secured to the press frame by snap closure means; mixing troughs of the lower press and an upper press which are each composed of two second housing elements which conform to the contour of receiving spaces of the upper press and the lower press and also to screw presses of the upper press and lower press; and the second housing elements are radially pivotally attached to the press frame by way of vertically displaceable holders.

4. A vacuum press comprising:
- an upper press housing comprising horizontally hinged cylinder halves;
- a horizontally hinged sieve plate holder; and
- a vacuum chamber comprising a horizontally hinged housing which can also be vertically raised and lowered.

5. A vacuum press according to claim 4, wherein
- the sieve plate holder is connected to detachable housing elements and
- is pivotally movable with respect to a press frame.

6. A vacuum press according to claim 4 that further comprises:
- the vacuum chamber being interposed between the upper press and a lower press;
- said vacuum chamber being arranged so that it is movable horizontally via hinged means; and
- said vacuum chamber being secured to a feed opening of said lower press.

7. A vacuum press according to claim 4 that further comprises:
- second housing elements comprising mixing troughs of the upper press and a lower press;
- said second housing elements conforming to the contour of receiving spaces of said upper press and said lower press and also to screw presses of said upper press and said lower press; and
- said second housing elements being pivotally attached to a press frame.

8. A vacuum press according to claim 4 that further comprises:
- the sieve plate holder being connected to detachable housing elements;
- the vacuum chamber being interposed between the upper press and a lower press;
- said vacuum chamber being arranged so that is movable horizontally via hinge means; and
- said vacuum chamber being secured to a feed opening of said lower press.

9. A vacuum press according to claim 4 which further comprises:
- the sieve plate holder being connected to detachable housing elements;
- said sieve plate holder being pivotally movable with respect to a press frame;
- the vacuum chamber being interposed between the upper press and a lower press;
- second housing elements comprising mixing troughs of the upper press and the lower press;
- said second housing elements conforming to the contour of receiving spaces of said upper press and said lower press and also to screw presses of said upper press and said lower press; and
- said second housing elements being pivotally attached to the press frame.

10. A vacuum press according to claim 4 which further comprises:
- the vacuum chamber being interposed between the upper press and a lower press;
- said vacuum chamber being arranged so that it is movable horizontally via hinge means;
- said vacuum chamber being secured to a feed opening of said lower press;
- second housing elements comprising mixing troughs of the upper press and the lower press;
- said second housing elements conforming to the contour of receiving spaces of said upper press and said lower press and also to screw presses of said upper press and said lower press; and
- said second housing elements being pivotally attached to a press frame.

* * * * *